United States Patent
Dobbins et al.

(10) Patent No.: US 7,423,413 B2
(45) Date of Patent: Sep. 9, 2008

(54) POWER SUPPLY FOR A LOAD CONTROL DEVICE

(75) Inventors: Aaron Dobbins, Macungie, PA (US);
Russell Weightman, Abington, PA (US);
David J Perreault, Brookline, MA (US);
James P Steiner, Royersford, PA (US);
Chen Ming Wu, Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 257 days.

(21) Appl. No.: 11/447,489

(22) Filed: Jun. 6, 2006

(65) Prior Publication Data

US 2006/0273775 A1    Dec. 7, 2006

Related U.S. Application Data

(60) Provisional application No. 60/738,083, filed on Nov. 18, 2005, provisional application No. 60/687,691, filed on Jun. 6, 2005.

(51) Int. Cl.
*G05F 1/455* (2006.01)
*H02J 3/12* (2006.01)

(52) U.S. Cl. ............... 323/242; 323/239

(58) Field of Classification Search ........... 323/235, 323/237, 239, 241, 242, 243, 244, 246; 327/446, 327/452, 455, 456, 469, 476
See application file for complete search history.

(56) References Cited

U.S. PATENT DOCUMENTS

| | | | |
|---|---|---|---|
| 3,422,309 A | | 1/1969 | Spira et al. |
| 3,619,656 A | * | 11/1971 | Domke ........................ 327/484 |
| 4,051,425 A | * | 9/1977 | Smith ........................... 363/86 |
| 4,069,446 A | * | 1/1978 | Yonehara .................... 318/466 |
| 4,409,528 A | * | 10/1983 | Podell ......................... 318/246 |
| 4,560,909 A | | 12/1985 | Peil |
| 4,563,592 A | | 1/1986 | Yuhasz et al. |
| 4,689,547 A | | 8/1987 | Rowen et al. |
| 4,743,834 A | * | 5/1988 | Rice ............................ 323/239 |
| 4,745,351 A | | 5/1988 | Rowen et al. |
| 4,782,322 A | | 11/1988 | Lechner et al. |
| 4,797,599 A | | 1/1989 | Ference et al. |
| 4,841,221 A | | 6/1989 | Barney et al. |
| 4,876,498 A | | 10/1989 | Luchaco et al. |
| 4,914,327 A | * | 4/1990 | Dekker ....................... 327/456 |
| 4,954,768 A | | 9/1990 | Luchaco et al. |

(Continued)

*Primary Examiner*—Gary L Laxton
(74) *Attorney, Agent, or Firm*—Ostrolenk, Faber, Gerb & Soffen, LLP

(57) ABSTRACT

A power supply for a load control device is disposed in series with an AC voltage source and a load and generates a substantially DC voltage for powering a controller of the load control device. The power supply is operable to provide substantially all voltage provided by the AC voltage source to the load and includes a controllably conductive device, a triggering device, and a charging circuit. The charging circuit is operable to charge an energy storage device and to conduct current to the load when the controllably conductive device is non-conductive. The controllably conductive device begins conducting the full load current when the energy storage device has charged to a predetermined amount of energy. Before the controllably conductive device begins to conduct, only a minimal voltage, which is substantially the same as the break-over voltage of the triggering circuit, develops across the power supply to allow the energy storage device to charge.

16 Claims, 7 Drawing Sheets

U.S. PATENT DOCUMENTS

| | | |
|---|---|---|
| RE33,504 E | 12/1990 | Yuhasz et al. |
| 5,017,837 A | 5/1991 | Hanna et al. |
| 5,189,412 A | 2/1993 | Mehta et al. |
| 5,365,154 A | 11/1994 | Schneider et al. |
| 5,747,973 A * | 5/1998 | Robitaille et al. ........... 323/239 |
| 5,959,440 A * | 9/1999 | Tobita et al. ................ 323/237 |
| 6,262,565 B1 | 7/2001 | Williams et al. |
| 6,396,672 B1 | 5/2002 | Deam |
| 7,012,518 B2 | 3/2006 | Novikov |
| 7,034,899 B2 | 4/2006 | Symoen et al. |
| 7,193,404 B2 | 3/2007 | Weightman |
| 2006/0255745 A1 | 11/2006 | DeJonge et al. |
| 2006/0255959 A1 | 11/2006 | Salvestrini |

* cited by examiner

POWER SUPPLY FOR A LOAD CONTROL DEVICE

RELATED APPLICATIONS

This application claims priority from commonly-assigned U.S. Provisional Application Ser. No. 60/687,691, filed Jun. 6, 2005, and from commonly-assigned U.S. Provisional Application Ser. No. 60/738,083, filed Nov. 18, 2005, both having the same title as the present application. The entire disclosures of both provisional applications are hereby incorporated by reference.

BACKGROUND OF THE INVENTION

1. Field of the Invention

The present invention relates to an apparatus for independently controlling a motor, for example, a fan motor, together with a lighting source contained within the same enclosure as the fan motor or coupled to the fan motor. More specifically, the invention relates to a power supply for a remote control device for providing individual control of the lighting source and the fan motor.

2. Description of the Related Art

It is often desirable to include a lamp in the same enclosure as a fan motor. Since the lamp and the fan motor are often wired in parallel, the lamp and the fan motor are generally controlled together from a switch located remotely from the lamp and the fan motor. FIG. 1A shows a prior art light and fan motor control system 10. The system 10 includes a maintained switch 12 coupled between an alternating-current (AC) voltage source 14 and two loads: a fan motor 16 and a lighting load 18. The fan motor 16 and the lighting load 18 are connected in parallel such that when switch 12 is closed the fan motor 16 and the lighting load 18 will both be on, and when the switch 12 is open the fan motor 16 and the lighting load 18 will both be off.

There are also various schemes for independent control of a fan motor as well as a lighting load from a remote location such as a wallstation. FIG. 1B shows a prior art light and fan motor control system 20, having a dual light and fan speed control 22 coupled to the AC voltage source 14. The dual light and fan speed control 22 has two outputs: the first output coupled to the fan motor 16 and the second output coupled to the lighting load 18, to allow for independent control of the loads. Further, the dual light and fan speed control 22 includes a fan speed circuit for adjusting the speed at which the fan motor 16 turns and a dimmer circuit for changing the intensity of the lighting load 18. The dual light and fan speed control 22 is often mounted in a standard electrical wallbox and includes a user interface to allow a user to separately control the lighting load and the fan motor.

However, the dual light and fan speed control 22 requires two separate wires to be connected between the control and the loads, i.e., the lighting load 18 and the fan motor 16. If these two connections are not provided between the wallbox and the enclosure containing the lamp and the fan motor, independent control of the lighting load and the fan motor will not be possible. Further, in the system 20 of FIG. 1B, it is only possible to have one dual light and fan speed control 22, and thus, only one user interface to allow for adjustment of the light intensity and the fan speed. Control of the fan motor and lighting load from more than one location is not possible in this system.

Thus, it is desirable to provide a reliable means to independently control from a remote location a fan motor and a lighting load that are located in the same enclosure. Since a consumer may wish to locate the fan motor and the attached lamp in a position previously occupied by only a lamp controlled by a standard single-pole single-throw wall switch, it is desirable to be able to control the fan motor as well as the attached lamp independently, using a two-wire control device. A two-wire control device is a control device that has only two electrical connections (one connection to the AC voltage source and the other connection to the enclosure containing the lamp and the fan motor) and does not have a neutral connection. As shown in FIG. 1A, this kind of system typically only includes a switch in series electrical connection between the AC voltage source and the lamp/fan and no neutral connection is available in the electrical wallbox where the switch is housed. Since it is desirable to control the fan motor and the lamp independently, using the existing building wiring, it is necessary to develop a means to allow independent control over the existing building wiring consisting of a single pair of wires connecting the remote wallstation to the lamp/fan apparatus.

Such a remote wallstation preferably includes a microcontroller to receive inputs from a user interface and to communicate with a load control device in the enclosure of the lighting load and the fan motor. To power the microcontroller with a substantially direct-current (DC) voltage, the wallstation must also include a DC power supply.

Thus, there exists a need for a power supply for a two-wire load control device that passes as much of the voltage from the AC voltage source to the loads (or another load control device) as possible and derives a minimal amount of power from the AC voltage source to power a microcontroller and other low-voltage circuitry.

SUMMARY OF THE INVENTION

The invention provides a power supply disposed in series with an AC load for charging an energy storage device from an AC voltage of an AC supply. The power supply comprises a controllably conductive device, a triggering circuit, and a charging circuit. The controllably conductive device is adapted to carry a load current from the AC supply to the load when the controllably conductive device is conductive. The triggering circuit is operable to cause the controllably conductive device to become conductive. The charging circuit is operable to charge the energy storage device during a time period before the controllably conductive device becomes conductive. The charging circuit imposes a low voltage drop relative to the peak of the AC voltage such that substantially all of the AC voltage is available to the load during the time when the controllably conductive device is non-conductive. The triggering circuit is operable to cause the controllably conductive device to become conductive when the energy storage device has charged to a predetermined amount of energy.

The present invention further provides a power supply adapted to be disposed in series electrical connection between an electrical load and an AC voltage source and operable to generate a DC voltage. The power supply comprises a controllably conductive device having a control input, a triggering circuit, and a charging circuit. The controllably conductive device is adapted to carry a load current from the AC voltage source to the electrical load when the controllably conductive device is conductive. The triggering circuit is coupled to the control input of the controllably conductive device for causing the controllably conductive device to become conductive. The charging circuit is operable to charge an energy storage capacitor when the controllably conductive device is non-conductive such that the DC voltage is produced across the energy storage capacitor. The charging circuit imposes a low voltage drop relative to the peak value of an AC voltage of the AC voltage source such that substantially all of the AC voltage is available to the load during the time when the controllably conductive device is non-conductive. The charging circuit is operable to stop charging the energy storage capacitor when the controllably conductive device is conductive. The triggering circuit is operable to cause the controllably conductive device to become conductive in response to the DC voltage so as to cause the energy storage capacitor from charging.

According to another aspect of the present invention, a remote control device for an electrical load is adapted to be coupled in series electrical connection between the electrical load and an AC voltage source. The remote control device comprises a communication circuit, a controller, and a power supply. The communication circuit is operable to transmit control information for controlling the electrical load. The controller is coupled to the communication circuit for providing the control information to the communication circuit. The power supply is adapted to be coupled in series electrical connection between the electrical load and the AC voltage source and is operable to generate a DC voltage to power the communication circuit and the controller. The power supply comprises a charging circuit for charging an energy storage device. The charging circuit imposes a low voltage drop relative to the peak value of an AC voltage of the AC voltage source such that substantially all of the AC voltage is available to the load during the time when the energy storage device is charging.

In addition, the present invention provides a method of generating a DC voltage in a remote control device adapted to be disposed in series electrical connection between an AC voltage source and an electrical load. The method comprises the steps of: (1) coupling a controllably conductive device is series electrical connection between the AC voltage source and the electrical load, the controllably conductive device having a control input; (2) charging an energy storage device through a charging circuit when the controllably conductive device is non-conductive; (3) rendering the controllably conductive device conductive in response to the step of charging the energy storage device; and (4) stopping the charging of the energy storage device in response to the step of rendering the controllably conductive device conductive. The charging circuit imposes a low voltage drop relative to the peak value of the AC voltage such that substantially all of the AC voltage is available to the load during the time when the controllably conductive device is non-conductive.

Other features and advantages of the present invention will become apparent from the following description of the invention, which refers to the accompanying drawings.

BRIEF DESCRIPTION OF THE DRAWINGS

The invention will now be described in greater detail in the following detailed description with reference to the drawings in which.

DETAILED DESCRIPTION OF PREFERRED EMBODIMENTS OF THE INVENTION

Figure 1A:
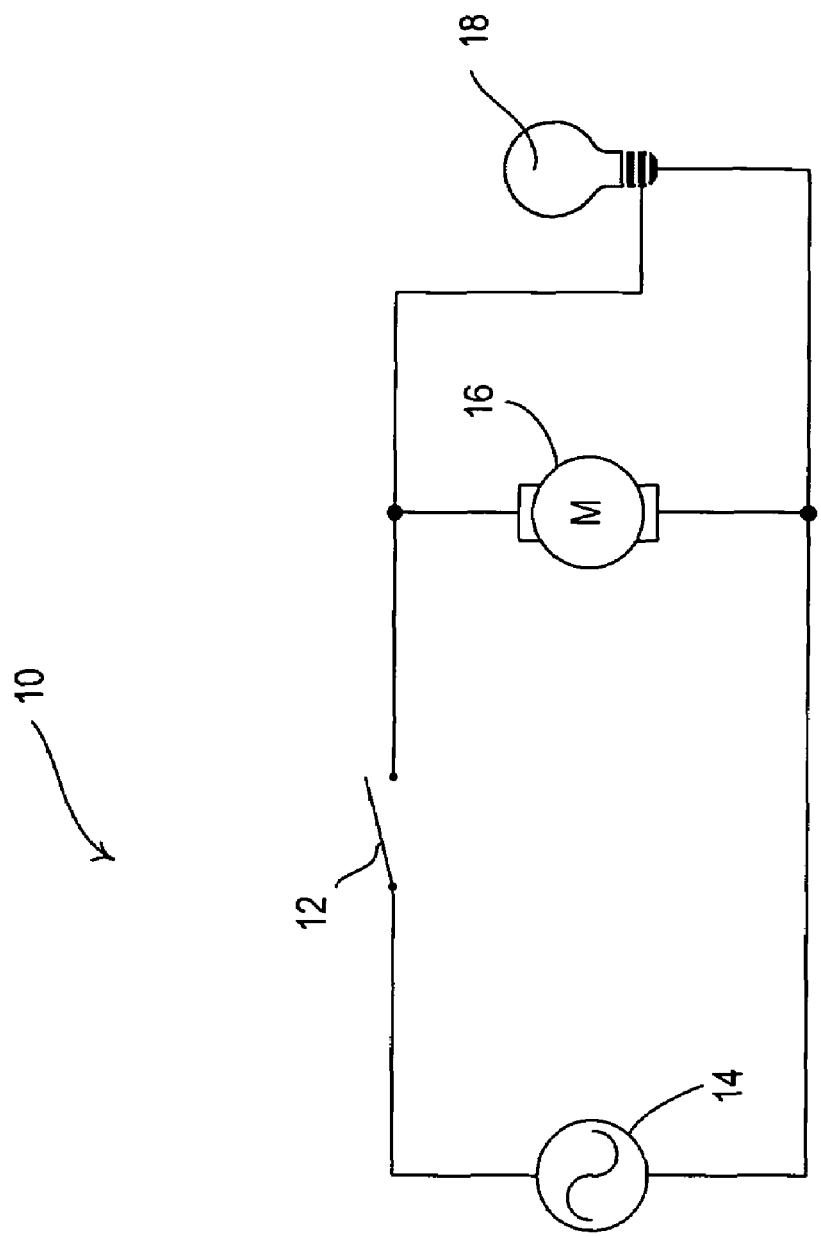
FIG. 1A is a simplified block diagram of a prior art light and fan motor control system.
Figure 1B:
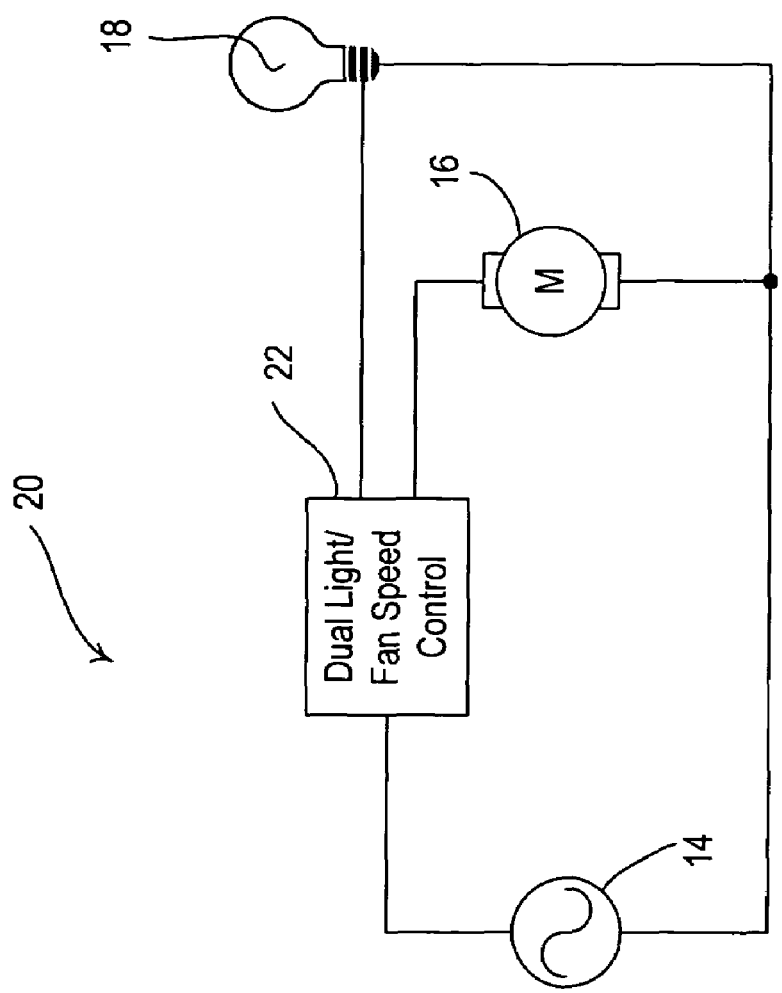
FIG. 1B is a simplified block diagram of a prior art light and fan motor control system including a dual light and fan speed control.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

As is well known, a lamp and a fan motor are typically packaged in the same housing. It is desirable to be able to control the lamp and fan motor independently from the same remote location, for example, a wallstation. However, the two circuits to control the lamp and the fan motor are typically different. The lamp may be controlled by a series switch, typically a phase-angle dimmer. The fan motor may be controlled by a shunt switch in parallel with the fan motor, which is disclosed in commonly-assigned co-pending U.S. Patent Application Ser. No. 11/447,728, filed on the same day as the present application, entitled METHOD AND APPARATUS FOR QUIET VARIABLE MOTOR SPEED CONTROL, the entire disclosure of which is hereby incorporated by reference.

Figure 2:
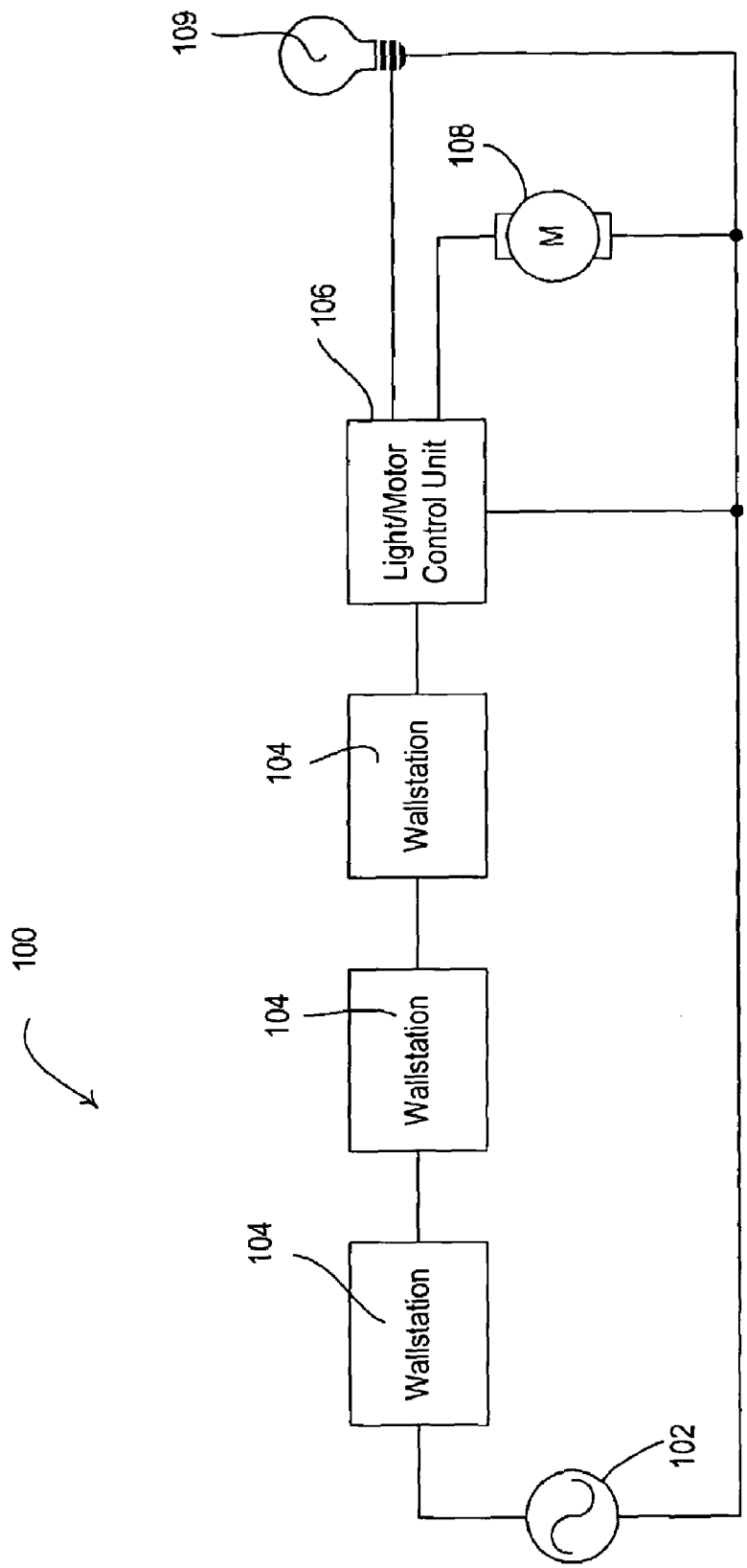
FIG. 2 is a simplified block diagram of a system for control of lights and fan motors according to the present invention.

A block diagram of a system 100 for independent control of lights and fan motors is shown in FIG. 2. The system includes a plurality of wallstations 104, i.e., remote controls, which are connected in series between an AC voltage source 102 and a light/motor control unit 106. The light/motor control unit 106 is operable to control both the speed of a fan motor 108 and the intensity of a lighting load 109. The system 100 for independent control of lights and fan motors is described in greater detail in commonly-assigned co-pending U.S. patent application Ser. No. 11/447,728, filed on the same day as the present application, entitled SYSTEM FOR CONTROL OF LIGHTS AND MOTORS, the entire disclosure of which is hereby incorporated by reference.

In the system 100 of FIG. 2, it is desirable to provide substantially the full AC voltage from the AC voltage source 102 to the light/motor control unit 106 for operation of the fan motor 108 and the lighting load 109. Since the wallstations 104 are coupled in series electrical connection, it is desirable to minimize the voltage drop across each wallstation 104. Thus, it is not desirable to develop a significant voltage across each of the wallstations 104 in order to charge an internal DC power supply to power the low-voltage circuitry of the wallstation.

Figure 3:
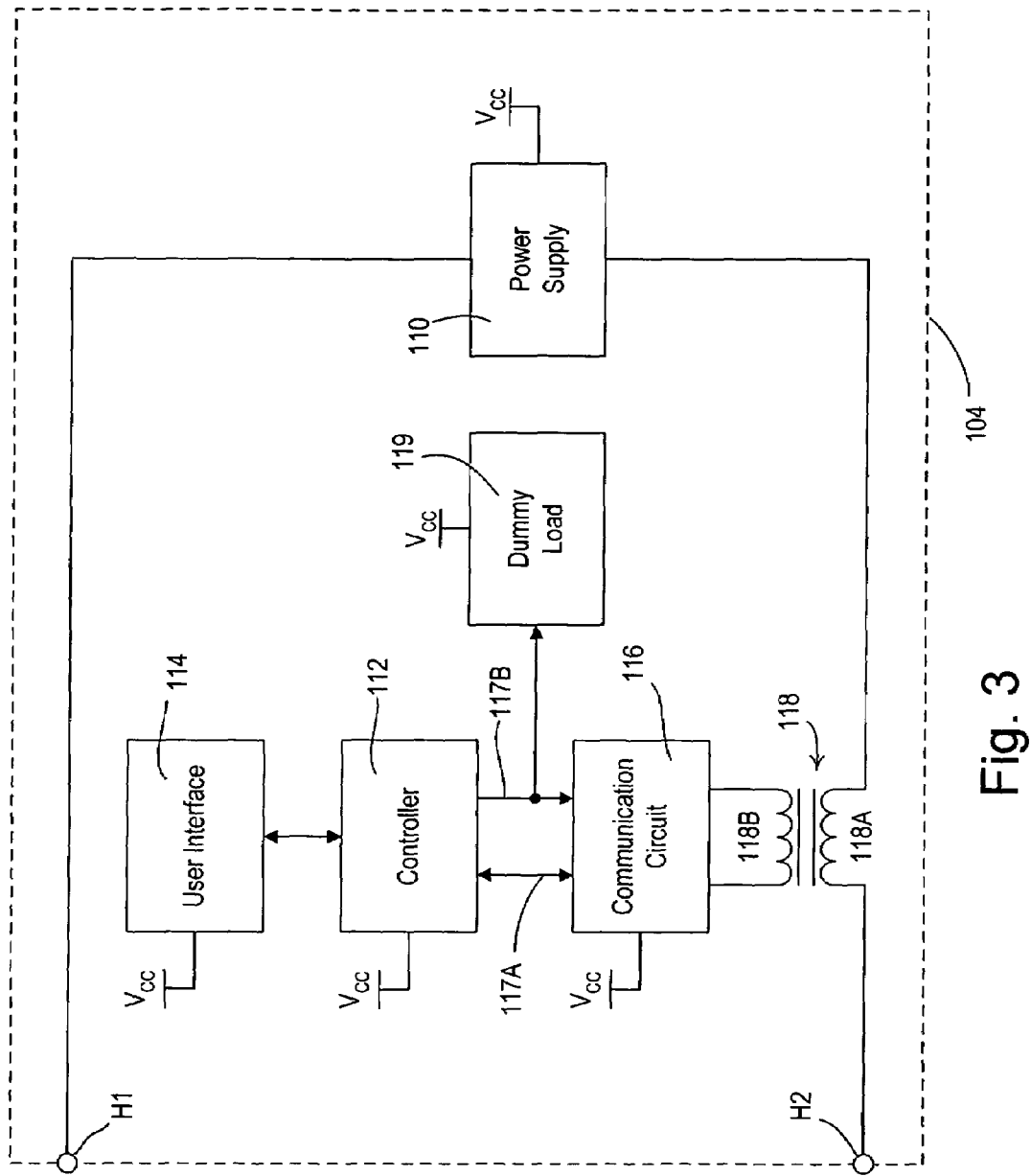
FIG. 3 is a simplified block diagram of a wallstation of the system of FIG. 2.

FIG. 3 is a simplified block diagram of the wallstation 104, which includes a power supply 110, a controller 112, a user interface 114, and a communication circuit 116. The power supply 110 is provided in series between a first electrical terminal H1 and a second electrical terminal H2. The power supply 110 provides a DC voltage, $V_{CC}$, to power the controller 112, the user interface 114, and the communication circuit 116. The controller 112 is preferably implemented as a microcontroller, but may be any suitable processing device, such as a programmable logic device (PLD), a microprocessor, or an application specific integrated circuit (ASIC).

The user interface 114 includes a plurality of buttons for receiving inputs from a user and a plurality of light emitting diodes (LEDs) for providing feedback to the user. The controller 112 accepts control inputs from the buttons of the user interface 114 and controls the operation of the LEDs. The user interface 114 may also include a wireless communications port for receiving inputs from a wireless transmitter, for example, an infrared (IR) or radio frequency (RF) remote control.

The controller 112 is also coupled to the communication circuit 116 for transmitting and receiving control information to and from the light/motor control unit 106 and the other wallstations 104 of system 100. The control information is transmitted between the controller 112 and the communication circuit 116 via a data signal 117A. The communication circuit 116 transmits and receives the control information via a communications transformer 118 over the hot line, which is coupled from the AC voltage source 102 via the wallstations 104 to the light/motor control unit 106. The communications transformer 118 has a primary winding 118A that is connected in series electrical connection with the terminals H1, H2 of the wallstation 104, and a secondary winding 118B that is coupled to the communication circuit 116.

The controller 112 provides a communication-enable control signal 117B to the communication circuit 116. When the communication-enable control signal 117B is high, i.e., substantially the same as the DC voltage $V_{CC}$ of the power supply 110, the communication circuit 116 is operable to transmit the control information to the light/motor control unit 106 and other wallstations 104. The communication circuit 116 draws a substantially constant current, e.g., 12 mA, from the power supply 110 when transmitting the control information. When the communication-enable control signal 117B is low, i.e., substantially the same as circuit common, the communication circuit is disabled and draws a substantially minimal current from the power supply 110.

The wallstation 104 further comprises a dummy load 119 that is operable to draw a substantially constant current from the power supply 110 in response to the communication-enable control signal 117B. The operation of the dummy load 119 will be described in greater detail below.

Figure 4A:
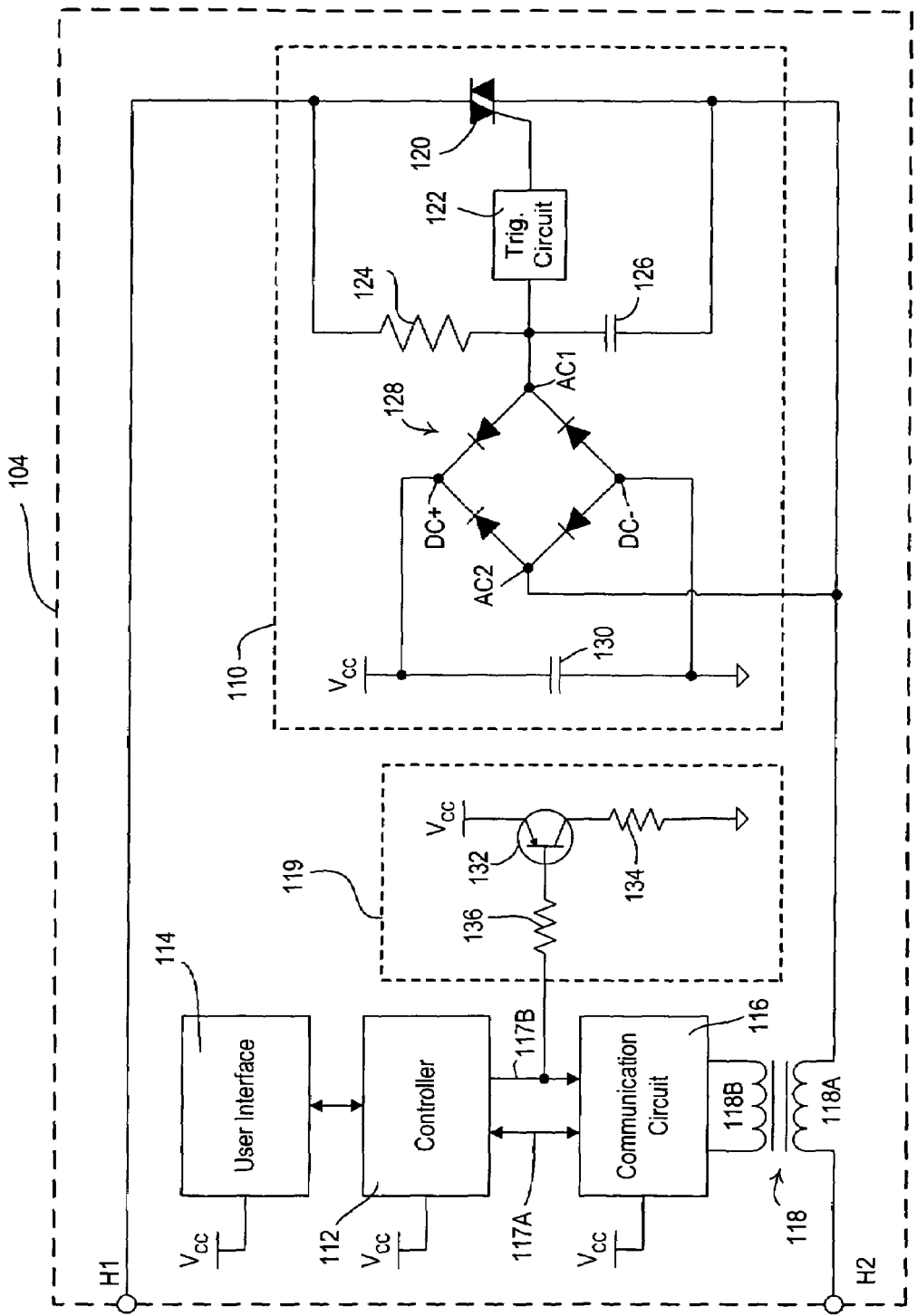
FIG. 4A is a simplified circuit diagram of a power supply of the wallstation of FIG. 3.

Turning to FIG. 4A, the power supply 110 of the wallstation 104 is shown in greater detail. The power supply 110 includes a controllably conductive device, such as a semiconductor switch, for example, a triac 120. The controllably conductive device could also be implemented as a relay or another type of semiconductor switch, such as two field effect transistors (FETs) in anti-series connection, or insulated gate bipolar junction transistors (IGBTs). The triac 120 has two main load terminals that are coupled in series between the terminals H1, H2. The triac 120 is operable to be selectively rendered conductive dependent on the input at a gate (i.e., a control input). The triac 120 becomes non-conductive when the current through the triac becomes approximately zero (i.e., at a zero-crossing. of the AC voltage source). However, if the semiconductor switch is implemented as two FETs in anti-series connection, for example, the FETs are operable to be selectively rendered non-conductive dependent on the input at the gate.

The gate of the triac 120 is coupled to a triggering circuit 122. The triggering circuit 122 may be implemented as a diac, a sidac, a silicon bilateral switch (SBS), one or more zener diodes, a comparator circuit, or a transistor circuit. A resistor-capacitor (RC) circuit, comprising a limiting resistor 124 and a firing capacitor 126, is coupled across the triac 120. The triggering circuit 122 is coupled in series with the gate of the triac 120 and the junction of the resistor 124 and the firing capacitor 126. The triggering circuit 122 has a break-over voltage, $V_{BO}$, and conducts current to and from the gate of the triac 120 only when the voltage across the firing capacitor 126 exceeds the break-over voltage $V_{BO}$. The limiting resistor 124 preferably has a resistance of 10Ω and the firing capacitor 126 preferably has a capacitance of 0.2 µF.

Figure 4B:
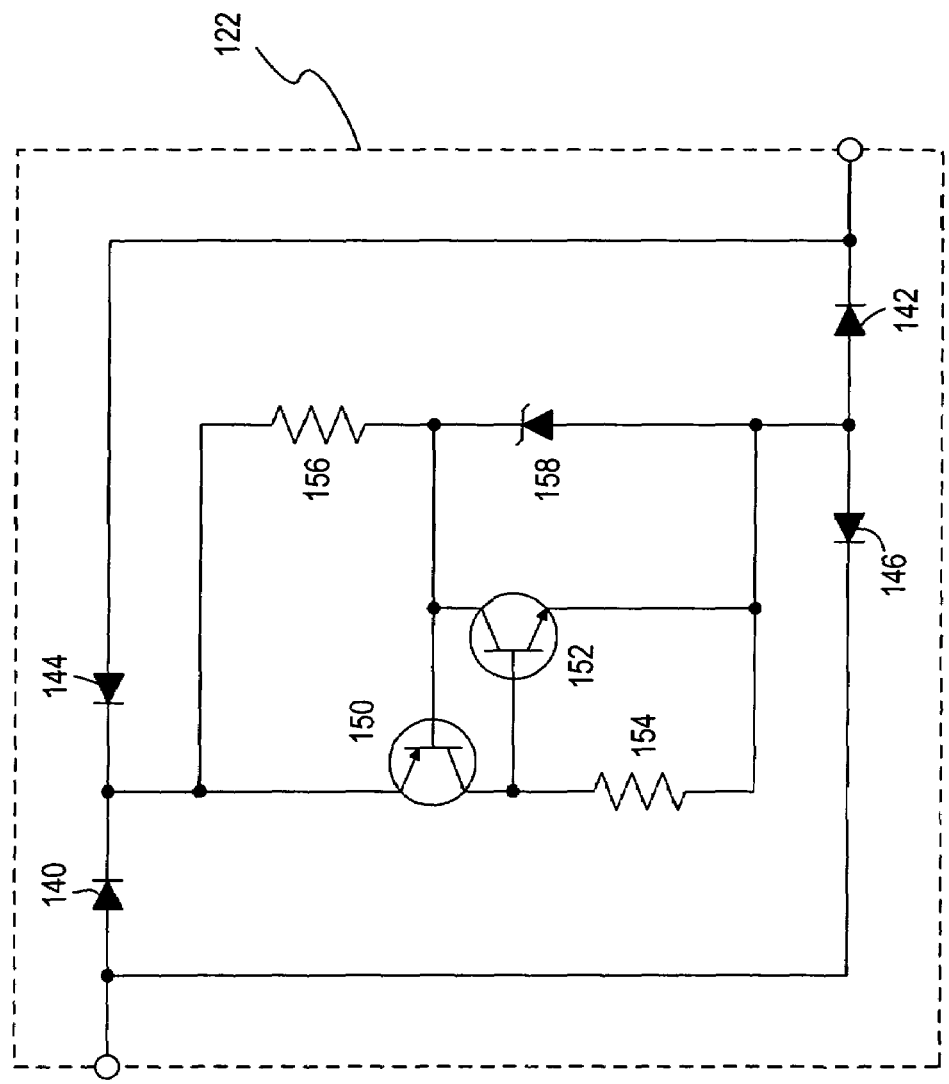
FIG. 4B is a simplified circuit diagram of a triggering circuit of the power supply of FIG. 4A.

FIG. 4B is a simplified schematic diagram of a possible implementation of the triggering circuit 122 of the power supply 110. The triggering circuit 122 includes a rectifier bridge (comprising four diodes 140, 142, 144, 146), two transistors 150, 152, two resistors 154, 156, and a zener diode 158. When the voltage across the triggering circuit 122 exceeds approximately the break-over voltage of the zener diode 158, the zener diode begins conducting current. The break-over voltage of the zener diode 158 defines the break-over voltage $V_{BO}$ of the triggering circuit 122. The transistor 150 begins conducting as the voltage across the resistor 156 reaches the required base-emitter voltage of the transistor 150. A voltage is then produced across the resistor 154, which causes the transistor 152 to begin conducting. This essentially "shorts out" the zener diode 158 such that the zener diode stops conducting and the voltage across the triggering circuit 122 falls to a substantially small voltage, i.e., the sum of the forward voltage drops of two of the diodes 140, 142, 144, 146 of the rectifier bridge, the base-emitter voltage of the transistor 150, and the saturation voltage of the transistor 152, which is typically in the range of 1.7 volts to 2.5 volts. This operation causes a pulse of current to flow through the triggering circuit 122 from the firing capacitor 126 through the gate of the triac 120. The rectifier bridge comprising the diodes 140, 142, 144, 146 allows current to flow through the triggering circuit 122 in both half-cycles.

The power supply 110 also includes a charging circuit comprising a rectifier bridge 128 having two terminals AC1, AC2 that are connected across the firing capacitor 126 and two terminals DC+, DC− that provide the DC voltage $V_{CC}$ across an energy storage device, for example, a storage capacitor 130. The voltage developed across the storage capacitor 130 provides power for the controller 112. The storage capacitor 130 preferably has a capacitance of 680 µF. Herein, the term "charging circuit" means a circuit for causing energy to be stored in an energy storage device and is not intended to be limited to a circuit for causing electrical charge to be stored in a capacitor.

The limiting resistor 124 limits the charging current through the rectifier bridge 128 and the storage capacitor 130. The limiting resistor 124 may be replaced with a short circuit if the impedance in series with the power supply 110 in the system 100 is enough to limit the peak charging current of the storage capacitor 130 to an appropriate level.

When the voltage across the terminals AC1, AC2 of the rectifier bridge 128, which is also the voltage across the firing capacitor 126, exceeds the break-over voltage $V_{BO}$ of the triggering circuit 122, a gate current flows through the gate of the triac 120 and the triac begins conducting current through the main load terminals. The firing capacitor 126 consistently provides enough charge to produce the gate current through the gate of the triac 120 when the triggering circuit 122 begins conducting. However, the firing capacitor 126 is not necessary for proper operation of the power supply 110, since the gate current can be drawn through the resistor 124, and may be omitted.

The generated DC voltage $V_{CC}$ has a ripple, and thus, a maximum value ($V_{CC-MAX}$) that is set by the break-over voltage of the triggering circuit 122 and a minimum value ($V_{CC-MIN}$) that is dependent on the current drawn by the controller 112 between the times that the triggering circuit 122 breaks over. The break-over voltage $V_{BO}$ of the triggering circuit 122 is preferably the same as the desired maximum value of the DC voltage $V_{CC-MAX}$, plus the forward voltage drop $V_D$ of two of the diodes in the rectifier bridge 128, i.e., $$V_{BO}=V_{CC-MAX}+2*V_D. \quad \text{(Equation 1)}$$

Thus, assuming $V_D$ is 0.6 volts, and that the desired $V_{CC-MAX}$ is 5.1 volts, then $V_{BO}$ is preferably approximately 6.3 volts.

Since the break-over voltage $V_{BO}$ is related to the desired maximum value of the DC voltage $V_{CC-MAX}$ (as shown in Equation 1), the triggering circuit 122 begins conducting current, and thus the triac 120 begins conducting current, in response to the DC voltage $V_{CC}$ across the storage capacitor 130 reaching $V_{CC-MAX}$ (i.e., the energy storage device has charged to a predetermined amount of energy). As a result, the voltage across the triac 120 drops to a substantially low voltage (e.g., 1.5 volts), which causes the storage capacitor 130 to stop charging. Accordingly, the power supply 110 exhibits a closed loop control scheme since the time that the storage capacitor 130 stops charging is dependent upon the DC voltage $V_{CC}$ across the storage capacitor.

As the storage capacitor 130 charges, a wallstation voltage, $V_{WS}$, which is equal to the present value of the DC voltage $V_{CC}$ of the power supply 110, plus two diode voltage drops $V_D$, i.e., $$V_{WS}=V_{CC}+2*V_D, \quad \text{(Equation 2)}$$

develops across the terminals H1 and H2 for a time period during each half-cycle until the voltage developed across the firing capacitor 126 reaches the break-over voltage $V_{BO}$ of the triggering circuit 122 and the triac 120 begins conducting. During the time that the triac 120 is non-conducting and the wallstation voltage $V_{WS}$ develops across the firing capacitor 126 and thus the wallstation 104, the load current flows through the limiting resistor 124, the rectifier bridge 128, and the storage capacitor 130, which charges to the voltage $V_{CC-MAX}$. During this time, the charging circuit imposes a low voltage drop relative to the peak of the AC voltage when current is flowing through the power supply 110 to the load. The resistor 124 preferably has a small resistance so that only an insignificant voltage is developed across the resistor when the load current is flowing through the storage capacitor 130. Thus, the maximum voltage drop across the wallstation 104 when the triac 120 is non-conducting is approximately the same as the break-over voltage $V_{BO}$ of the triggering circuit 122 (assuming the voltage drop across the resistor 124 is small).

Figure 5A:
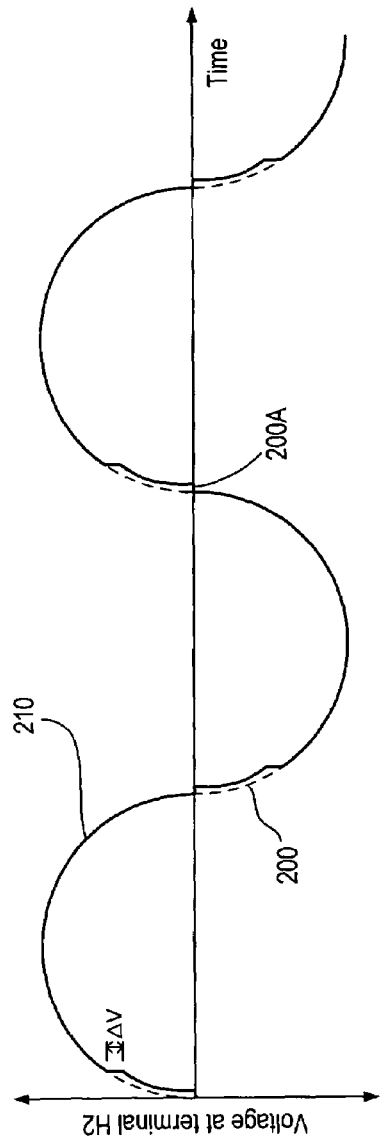
FIGS. 5A, 5B, and 5C show waveforms demonstrating the operation of the power supply of FIG. 4A.
Figure 5B:
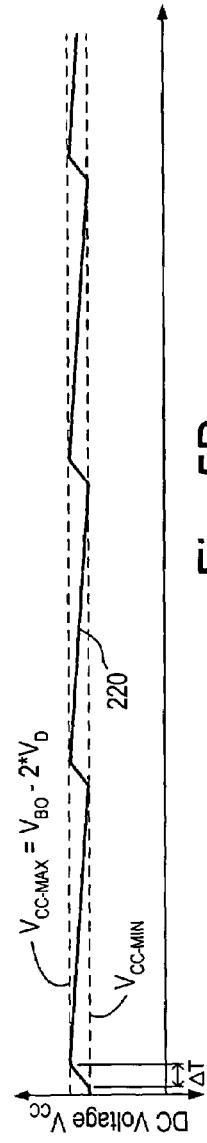
Figure 5C:
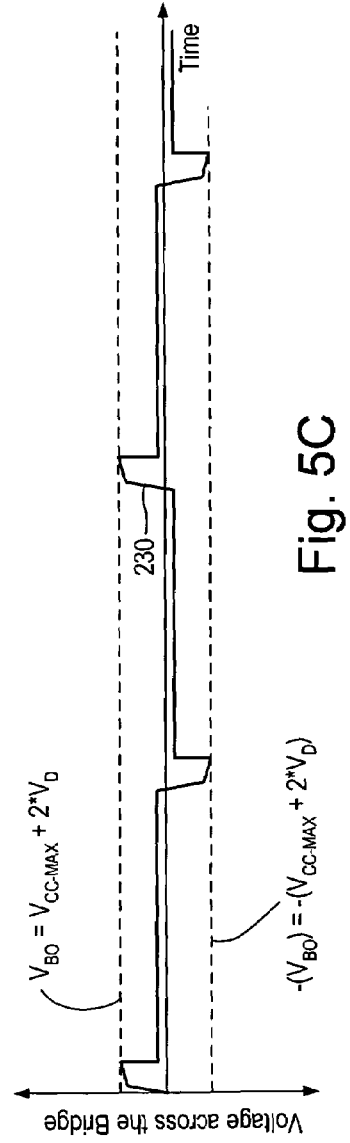

FIGS. 5A, 5B, and 5C show waveforms demonstrating the operation of the power supply 110. FIG. 5A shows a line voltage waveform 200 and an output voltage waveform 210 (i.e., the voltage measured from the load-side terminal of the wallstation 104 to neutral of the system 100). The power supply 110 induces only a minimal amount of distortion in the output voltage waveform 210 as a result of a voltage drop, ΔV, which is developed across the wallstation 104, and which is substantially equal to the break-over voltage $V_{BO}$. Note that no voltage is provided to the load during a short interval 200A at the beginning of each half-cycle, until the voltage across the wallstation exceeds the present value of the DC voltage $V_{CC}$ plus two diode voltage drops $V_D$, i.e., $V_{CC}+2*V_D$.

FIG. 5B show a DC voltage waveform 220 of the DC voltage $V_{CC}$ that is generated by the power supply 110. Until the voltage across the firing capacitor 126 (i.e., the voltage across the rectifier bridge 128) exceeds the break-over voltage $V_{BO}$, the storage capacitor 130 charges to the voltage $V_{CC-MAX}$, for a time interval, ΔT. The time interval ΔT is dependent upon the break-over voltage of the triggering circuit 122, and the minimum value $V_{CC-MIN}$, which is determined by the current drawn by the low-voltage circuitry connected to the storage capacitor 130 (i.e., the controller 112).

FIG. 5C show a bridge voltage waveform 230 of the voltage measured across the input terminals AC1, AC2 of the rectifier bridge 128. The bridge voltage waveform 230 is slightly less than the break-over voltage $V_{BO}$ of the trigger circuit 122 and increasing when the storage capacitor 130 is charging. After reaching the break-over voltage $V_{BO}$ (approximately 6.3V in the power supply 110 of the present invention), the bridge voltage waveform 230 drops to approximately 1V (i.e., the voltage drop across the triac 120). The bridge voltage waveform 230 is substantially the same as the voltage waveform measured across the wallstation 104 since the voltage drop across the resistor 124 is negligibly small.

The waveforms of FIGS. 5A, 5B, and 5C are shown solely to demonstrate the operation of the power supply 110. The waveforms as shown would result from a resistive load connected between the load-side terminal of the wallstation 104 closest to the loads and neutral of the AC supply 102, i.e., with a resistive load in place of the light/motor control unit 106 (see FIG. 2). However, a reactive load (such as the combination of the light/motor control unit 106, the fan motor 108, and the lighting load 109) causes a phase shift between the voltage and the current through the wallstation 104. Accordingly, this shifts the position of the charging time interval ΔT relative to the zero-crossing of the line voltage waveform 200, i.e., to some other time later in the half-cycle.

The light/motor control unit 106 utilized the zero-crossings of the line voltage waveform to control the motor load 108 and the lighting load 109. If the charging time interval ΔT of the power supply 110 of the wallstation 104 occurs near the zero-crossings, the light/motor control unit may encounter "zero-crossing noise", which may cause the lighting load 109 to flicker and motor load 108 to be controlled incorrectly. Zero-crossing noise occurs when the zero-crossings of the line voltage waveform is inconsistent from one line-cycle to the next.

Preferably, the charging time interval ΔT does not occur near the zero-crossings to reduce the possibility of noise in the detection of the zero-crossings. Further, the charging time interval ΔT should be a constant length of time from one half-cycle to the next. To ensure that the charging time interval ΔT each half-cycle, the wallstation 104 employs the dummy load 119 to draw current when the communication circuit 116 is not transmitting.

Referring to FIG. 4A, the dummy load 119 comprises a PNP bipolar-junction transistor (BJT) 132 coupled between the DC voltage $V_{CC}$ and a dummy load resistor 134. The base of the transistor 132 is coupled to the communication-enable signal 117B through a base resistor 136, e.g., having a resistance of 4.7 kΩ. When the communication-enable signal 117B is high (i.e., the communication circuit 116 is transmitting), the base of the transistor 132 is also pulled high and no current flows through the dummy load resistor 134. However, when the communication-enable signal 117B is low (i.e., the communication circuit 116 is disabled), the transistor 132 is conductive and the dummy load resistor 134 draws a predetermined current from the storage capacitor 130. The dummy load resistor 134 is preferably sized such that the predetermined current is substantially the same as the current draw of the communication circuit 116. For example, the dummy load resistor 134 may have a resistance of 375Ω if the current drawn by the communication circuit 116 is 12 mA (assuming a saturation voltage of the transistor 132 of 0.3 V and an average DC voltage of 4.8 V across the storage capacitor 130).

Although the words "device" and "unit" have been used to describe the elements of the systems for control of lights and fan motors of the present invention, it should be noted that each "device" and "unit" described herein need not be fully contained in a single enclosure or structure. For example, the light/motor control unit 106 may comprise a controller in a wall-mounted device and fan motor control circuit in a separate location, e.g., in the canopy of the fan motor and the lamp. Also, one "device" may be contained in another "device".

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A power supply disposed in series with an AC load for charging an energy storage device from an AC voltage of an AC supply, the power supply comprising:
   a controllably conductive device adapted to carry a load current from the AC supply to the load when the controllably conductive device is conductive;
   a triggering circuit for causing the controllably conductive device to become conductive; and
   a charging circuit for charging the energy storage device when the controllably conductive device is non-conductive, the charging circuit imposing a low voltage drop relative to the peak value of the AC voltage such that substantially all of the AC voltage is available to the load during the time when the controllably conductive device is non-conductive;
   wherein the triggering circuit is operable to cause the controllably conductive device to become conductive when the energy storage device has charged to a predetermined amount of energy.

2. The power supply of claim 1, wherein the energy storage device comprises a storage capacitor.

3. The power supply of claim 2, wherein the charging circuit comprises a rectifier coupled across the controllably conductive device and supplies a DC voltage to the storage capacitor.

4. The power supply of claim 3, wherein the rectifier comprises a rectifier bridge.

5. The power supply of claim 1, wherein the controllably conductive device comprises a semiconductor switch.

6. The power supply of claim 5, wherein the semiconductor switch comprises a triac.

7. The power supply of claim 1, wherein the triggering circuit comprises a semiconductor triggering device.

8. The power supply of claim 7, wherein the semiconductor triggering device comprises a silicon bilateral switch, a diac, or a zener diode.

9. The power supply of claim 1, wherein the triggering circuit comprises a zener diode and two semiconductor switches.

10. A power supply adapted to be disposed in series electrical connection between an electrical load and an AC voltage source, the power supply operable to generate a DC voltage, the power supply comprising:
    a controllably conductive device adapted to carry a load current from the AC voltage source to the electrical load when the controllably conductive device is conductive, the controllably conductive device having a control input;
    a triggering circuit coupled to the control input of the controllably conductive device for causing the controllably conductive device to become conductive; and
    a charging circuit operable to charge an energy storage capacitor when the controllably conductive device is non-conductive such that the DC voltage is produced across the energy storage capacitor, the charging circuit imposing a low voltage drop relative to the peak value of an AC voltage of the AC voltage source such that substantially all of the AC voltage is available to the load during the time when the controllably conductive device is non-conductive, the charging circuit operable to stop charging the energy storage capacitor when the controllably conductive device is conductive;
    wherein the triggering circuit is operable to cause the controllably conductive device to become conductive in response to the DC voltage so as to cause the energy storage capacitor to stop charging.

11. A remote control device for an electrical load, the remote control device adapted to be coupled in series electrical connection between the electrical load and an AC voltage source, the remote control device comprising:
    a communication circuit operable to transmit control information for controlling the electrical load;
    a controller coupled to the communication circuit for providing the control information to the communication circuit; and
    a power supply adapted to be coupled in series electrical connection between the electrical load and the AC voltage source and operable to generate a DC voltage to power the communication circuit and the controller, the power supply comprising a charging circuit for charging an energy storage device, the charging circuit imposing a low voltage drop relative to the peak value of an AC voltage of the AC voltage source such that substantially all of the AC voltage is available to the load during the time when the energy storage device is charging.

12. The remote control device of claim 11, wherein the power supply further comprises:
    a first controllably conductive device adapted to carry a load current from the AC supply to the load when the first controllably conductive device is conductive, the first controllably conductive device having a control input; and
    a triggering circuit coupled to the control input of the first controllably conductive device for causing the first controllably conductive device to become conductive; and
    wherein the charging circuit is operable to charge the energy storage device when the first controllably conductive device is non-conductive, and the triggering circuit is operable to cause the first controllably conductive device to become conductive when the energy storage device has charged to a predetermined amount of energy.

13. The remote control device of claim 12, further comprising:
    a second controllably conductive device having a control input coupled to the controller for causing the second controllably conductive device to become conductive; and
    a resistor coupled in series electrical connection with the second controllably conductive device, the series combination of the second controllably conductive device and the resistor coupled in parallel electrical connection with the energy storage device;

wherein the controller is operable to render the second controllably conductive device conductive when the communication circuit is not transmitting the control information.

14. A method of generating a DC voltage in a remote control device adapted to be disposed in series electrical connection between an AC voltage source and an electrical load, the method comprising the steps of:

coupling a controllably conductive device is series electrical connection between the AC voltage source and the electrical load, the controllably conductive device having a control input;

charging an energy storage device through a charging circuit when the controllably conductive device is non-conductive, the charging circuit imposing a low voltage drop relative to the peak value of the AC voltage such that substantially all of the AC voltage is available to the load during the time when the controllably conductive device is non-conductive;

rendering the controllably conductive device conductive in response to the step of charging the energy storage device; and stopping the charging of the energy storage device in response to the step of rendering the controllably conductive device conductive.

15. The method of claim 14, wherein the energy storage device comprises a capacitor.

16. The method of claim 14, wherein the step of rendering the controllably conductive device conductive comprises the step of causing the controllably conductive device to become conductive when the energy storage device has charged to a predetermined amount of energy.

* * * * *